United States Patent

Monroe

[15] 3,652,986

[45] Mar. 28, 1972

[54] ERROR CONTROL TRANSCEIVER

[72] Inventor: Kenneth E. Monroe, Ann Arbor, Mich.

[73] Assignee: Datamax Corporation, Ann Arbor, Mich.

[22] Filed: Feb. 9, 1970

[21] Appl. No.: 9,585

[52] U.S. Cl. ....................340/146.1 R

[51] Int. Cl. ....................H04b 3/46

[58] Field of Search ....................340/146.1

[56] References Cited

UNITED STATES PATENTS

| | | | |
|---|---|---|---|
| 3,336,467 | 8/1967 | Frey | 340/146.1 X |
| 3,061,814 | 10/1962 | Crater | 340/146.1 |

*Primary Examiner*—Eugene G. Botz
*Assistant Examiner*—R. Stephen Dildine, Jr.
*Attorney*—Barnard, McGlynn and Reising

[57] ABSTRACT

An asynchronous data communication system wherein the transmitted signal represents two bit types, it being necessary to segregate the bit types at the receiver. To accomplish the segregation in the proper phase, a selected randomly occurring bit group is combined with a sync signal and converted to a special analog level which uniquely represents the simultaneous selected bit group and sync signal occurrence. The receiver decodes the special analog level back into the bit group and the sync signal and ensures that the bit type segregating unit is in the phase determined to be proper by the original bit type organization established in the transmitter.

8 Claims, 4 Drawing Figures

INVENTOR.
Kenneth E. Monroe
BY
Barnard, McGlynn & Reising
ATTORNEYS

INVENTOR.
Kenneth E. Monroe
BY
Barnard, McGlynn & Reising
ATTORNEYS

INVENTOR.
Kenneth E. Monroe
BY
Barnard, McGlynn & Reising
ATTORNEYS

ERROR CONTROL TRANSCEIVER

This invention relates to coded data communication systems and, more particularly, to a system wherein decoder data synchronization is accomplished in an asynchronous sending and receiving communication system by combining a sync signal with a predetermined and essentially randomly occurring information quantity to produce a transmitted information quantity having a synchronizing or time orienting quality.

A coded data communication system, as described herein, is a system for transmitting and receiving data signals in combination with redundant "parity" signals generated from data and intermingled with the data signals. The parity signals permit the identification and correction of certain signal errors. To decode such transmitted signals and to take advantage of any error correcting capability available, the receiver-decoder must distinguish between the data and parity signals. This may be accomplished in one of several well known ways: The transmitter and receiver may be fully synchronized or the transmitted signals may be placed in transmission blocks each of a certain length and being bounded by special identifying and synchronizing signals. Total synchronization is often impractical due to variable delays in the transmission link. On the other hand, block coding may be of lesser desirability than continuous coding and transmission for various reasons including simplicity and speed.

In accordance with the present invention, the proper functional relationship may be maintained between the transmitting and receiving portions of an asynchronous coded data communication system employing continuous coding and the intermingling of data and parity bits. In general, this is accomplished by preparing essentially randomly occurring information quantities representing coded data, generating a sync signal which periodically represents the beginning, for example, of an information quantity or some other regularly occurring transmitter condition, producing signal quantities such as distinct voltage levels representing the information quantities and producing an additional signal quantity whenever the sync signal occurs simultaneously with a preselected one of the information quantities. Accordingly, at random intervals in the transmitted stream, a signal quantity arrives at the receiver carrying both coded information and information concerning the proper state of the receiver-decoder at the time it operates on the received coded information quantity.

In accordance with the invention the receiver-decoder apparatus comprises means for carrying out the necessary conversions and transformations on the received signals to derive the original encoded signal set and further for segregating the data and parity portions of the signal set, the timing for such segregation being determined by a sync signal which is derived from one of the input signal quantities.

In a preferred form, the invention responds to serial convolutionally encoded data bits to produce transmittable signal quantities, each quantity representing the actual values of the bits in a bit group containing both data and parity bits. When a sync signal occurs at the input of an AND gate simultaneously with an information quantity representing a certain bit group, an additional and distinct signal quantity is generated. The receiver-decoder converts the signal quantities transmitted back into bit groups deriving the sync signal from the additional signal quantity and converting the bit groups into a serial stream of data and parity bits. The decoder further comprises a segregating unit which segregates data from parity bits under the control of the sync signal which places the segregating unit in a condition preestablished in the encoder to respond only to a selected bit type.

Further features and advantages of the present invention will be best understood by reference to the following description of a specific embodiment to the invention. This description is to be taken with the accompanying drawings of which:

Figure 1:
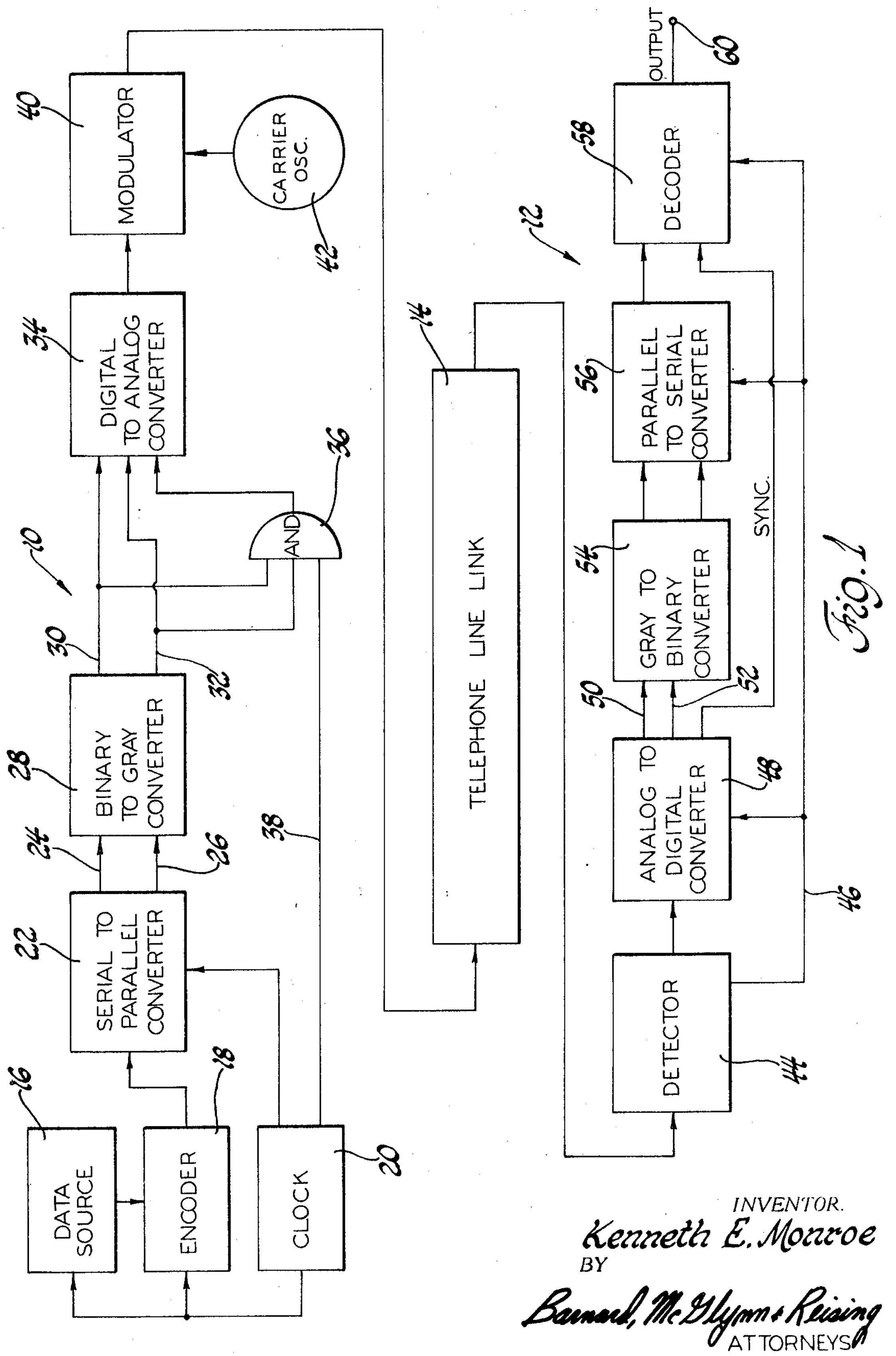
FIG. 1 is a block diagram of a complete communication system employing the invention.

Referring to FIG. 1, the illustrative embodiment of the invention is shown to comprise a transmitter portion 10, a receiver-decoder portion 12 and a telephone communication line 14 which operates to link the two portions together. The telephone communication link 14 may represent various degrees of delay and thus the portions 10 and 12 must necessarily be designed to operate asynchronously.

Transmitter portion 10 comprises a data source 16 such as a business machine which is capable of producing a substantially continuous serial stream of data signals in binary form and applying those binary signals to an encoder unit 18 at a rate set by a clock unit 20. Encoder 18 which will be described in greater detail with reference to FIG. 2, convoluntionally encodes the data bits received from source 16 and intermingles the data bits with parity bits in serial form and applies this continuous stream of data and parity bits to a serial-to-parallel converter 22. The converter 22 operates to segregate the continuous stream of data and parity bits into bit groups, each of which is two bits long in the illustrative example, and consists of one parity bit and one data bit. These bits appear on outputs 24 and 26 in parallel fashion for application to a binary-to-Gray code converter 28.

A Gray code, as is well known to those skilled in the art, is a reflected binary code employed to minimize transition errors in various data communication and telemetry systems. The use of the binary-to-Gray conversion unit 28 is not essential to the present invention but is preferred. In the event no such conversion is employed, the bit groups which result from the serial-to-parallel converter 22 represent the information quantities which in the present example emerge from the converter unit 28.

Output lines 30 and 32 of the binary-to-Gray converter 28 are connected to a five-level digital-to-analog converter 34 as well as to two of the three inputs of an AND gate 36. The third input to AND gate 36 is a sync pulse which is applied over line 38 from the clock unit 10 in a periodic fashion. In the present example the sync pulse applied to the AND gate 36 over line 38 occurs at the beginning of each of the bit groups prepared by the converter unit 22 and, thus, is in effect a baud signal representing a sharpened form of the rise time of a baud clock signal from unit 20, as will be further described hereinafter. The sync pulse need not occur at the beginning of each bit group; in some systems every other or every fourth bit group may suffice. The AND gate 36 is effective to produce an output only when ONES appear on lines 30, 32 and 38. This condition obtains only when each of the bits in the bit group prepared by unit 22 is a ONE and this combination of signals occurs at the beginning or rise time of a baud clock signal. Since the information content of the bit stream emerging from the source 16 and the encoder 18 is normally random in nature whereas the sync signal on line 38 is periodic, the AND gate 36 will produce an aperiodic or random output signal.

The digital-to-analog converter 34 responds to the information quantities or bit groups assembled by the converter units 22 and 28 as well as the output of and gate 36 to generate analog signals in the form of variable amplitude voltages representing the information contents of the information quantities. A suitable digital-to-analog converter may be constructed of operational amplifiers connected in a current summing relationship as set forth in the copending application Ser. No. 10,771 filed in the United States Patent Office on Feb. 12, 1970, entitled "Digital Automatic Gain Control," assigned to the assignee of this application. These variable amplitude voltages are signal quantities applied to a modulator 40 to modulate the amplitude of a time varying carrier signal produced by an oscillator 42. The amplitude modulated signals are applied to the telephone line link 14 for transmission to the receiver-decoder 12. Obviously, other signal communication links such as an FM and wireless types may be employed.

The receiver-decoder 12 comprises a synchronous detector 44 which is connected to receive the amplitude modulated signals from the transmission line link 14 to produce a sequence of variable amplitude voltages each having a signal value representative of an information quantity prepared by the transmitter 10. The synchronous detector 44 detects the rate at which the variable amplitude voltage levels occur and derives therefrom a clock signal which appears on line 46 for application to subsequent units in the portion 12.

The output of the detector 44 is applied to an analog-to-digital converter 48 which responds to each input signal value to produce a pair of bits on output lines 50 and 52 corresponding to the information quantity applied to the input of the converter 34 in transmitter portion 10. Converter 48 may be constructed from operational amplifiers representing digital values and having various input signal thresholds as set forth in the aforementioned copending application Ser. No. 10,771 and exhibits a transfer characteristic which is the inverse of that of converter 34.

The converter 48 is followed by a Gray-to-binary converter 54 which in turn is connected to a parallel-to-serial converter 56. Converter 56 disassembles the two bit groups into an entirely serial stream of parity and data bits and applies the serial stream to a decoder 58. Decoder 58 decodes the convolutionally encoded stream and applies decoded and corrected data bits to an output 60 at a rate controlled by the rate of reception of the variable amplitude voltage levels by the detector 44.

Decoder 58 is periodically set to a predetermined condition to accept either a data or parity bit by application thereto of a sync pulse which is derived from the analog-to-digital converter 48 upon receipt of the fifth level input signal thereto and which overrides the clock signal on line 46 if necessary. This fifth level input signal corresponds to the fifth level output of the digital-to-analog converter 34 which in turn corresponds to the occurrence of ONES simultaneously on lines 30, 32 and 38. Accordingly, the fifth level is a hybrid signal containing both information and timing.

Figure 2:
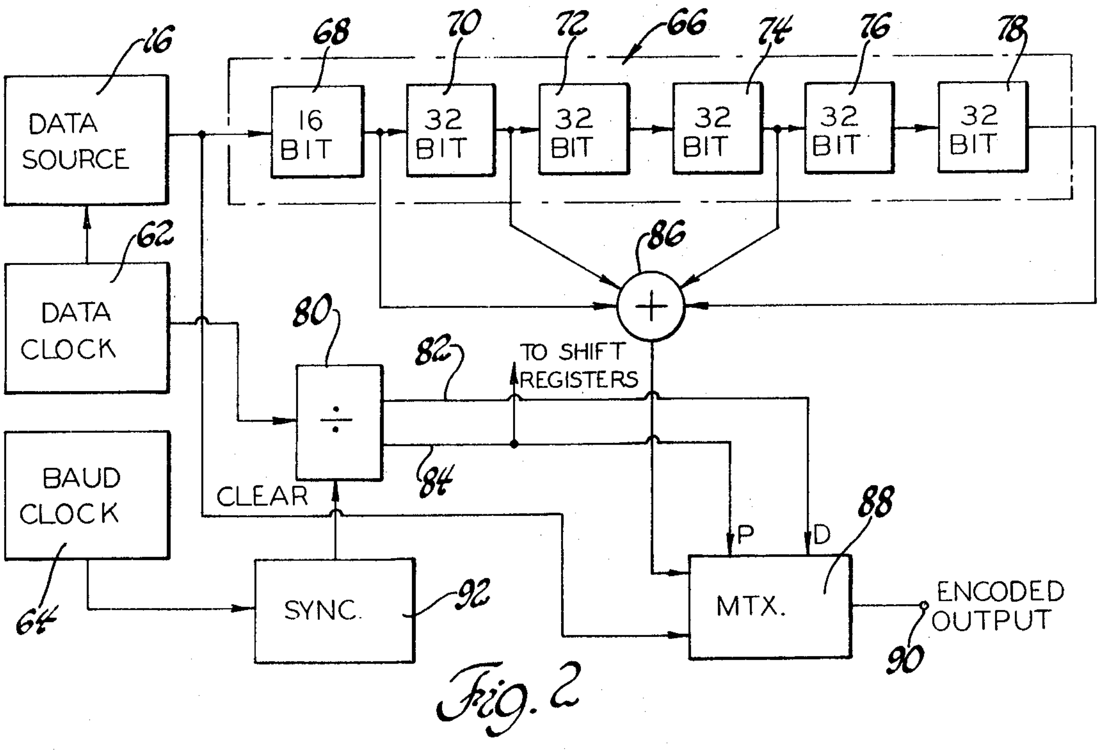
FIG. 2 is a block diagram of an illustrative encoder usable in the combination of FIG. 1.

Referring now to FIG. 2, the encoder unit 18 is shown in greater detail. Encoder 18 includes a serially connected register group 66 comprising a 16-bit register 68 and a series of 32-bit registers 70, 72, 74, 76 and 78. The total bit capacity of register group 66 is 176 data bits.

Data bits from the source 16 are shifted into the register group 66 under control of a data clock 62 which forms part of the clock unit 20 of FIG. 1. The output of the data clock 62 is connected to a frequency divider 80 such as a flip-flop which produces complementary outputs on lines 82 and 84. The signal appearing on line 84 is applied to each of the shift registers in the register group 66 to shift the data bits from left to right as shown in FIG. 2.

The output stages of the registers 68, 70, 74 and 78 are connected to a modulo two adder 86 which responds to the binary values of the signals applied thereto to generate parity bits equal to the modulo two sum of the selected data bits. The original data bits are applied to one input of a multiplexer unit 88 and the output of the parity generating modulo two adder 86 is connected to the other input thereof. The multiplexer unit 88 functions to intermingle the data and generated parity bits in serial fashion and apply such bits to an output terminal 90. To control the rate at which the parity and data bits are applied to the terminal 90, the complementary signal lines 82 and 84 from the divider 80 are connected to the multiplexer unit 88 such that the terminal 90 has appearing thereon a serial stream of parity and data bits, each parity bit being generated from a predetermined combination of previous data bits in the register group 66. It will be observed that since the registered group 66 is 176 bits in length, parity bit 177 is generated from data bits 1, 65, 129 and 161 and immediately precedes data bit 177. It is to be understood that the parity generating code pattern shown in FIG. 2 is merely illustrative of one pattern usable in a rate 1:2 encoder and that other patterns and other rates may be used.

The encoder of FIG. 2 further includes a baud clock 64 which produces a periodic output at one-half the data rate. The baud clock 64 is connected to a one-shot generator 92 which produces a short sync pulse which is applied to the "clear" input of the divider 80. The sync signal forces the divider 80 to assume the "parity" condition, i.e., line 84 is high, and thus always occurs at the beginning of a baud clock cycle, that is, upon the occurrence of a parity signal at the output terminal 90. It is this sync signal and the fact that its occurrence is invariably concurrent with a parity signal which establishes the receiver-decoder timing to properly segregate parity and data signals for decoding. This same sync signal is applied to the AND gate 36 of FIG. 1.

Figure 3:
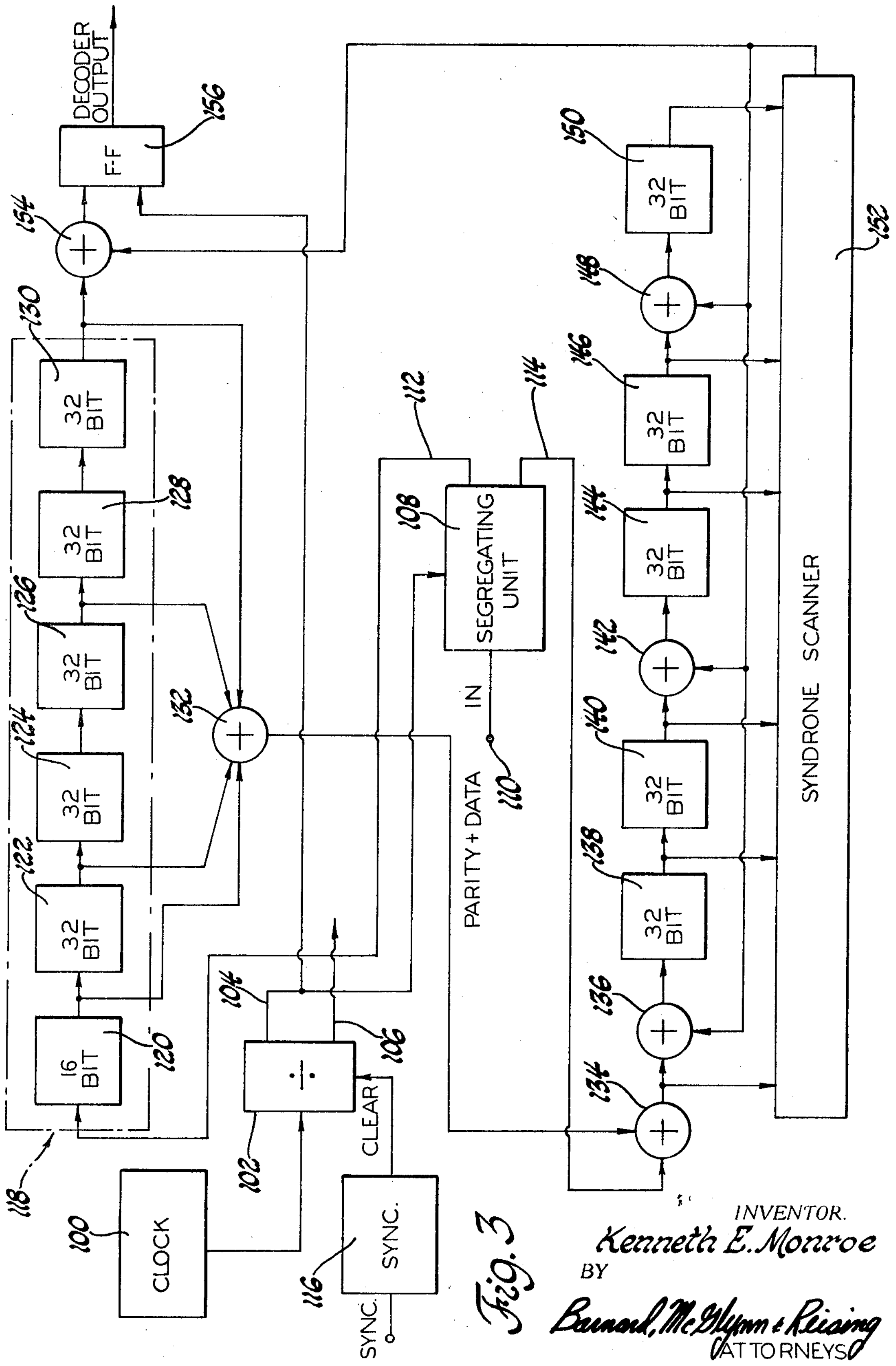
FIG. 3 is a block diagram of an illustrative decoder usable in the system of FIG. 1.

FIG. 3 shows the decoder unit 58 in greater detail. This unit includes a clock 100 which forms part of the synchronous detector 44 of FIG. 1 and produces clock signals at the rate at which variable amplitude input signals are received by the detector 44. The output of clock 100 is connected to a frequency divider 102 having complementary output signal lines 104 and 106. Line 104 is connected to a segregating unit 108 to direct the bits appearing on input 110 to one or the other of the output lines 112 and 114. When line 104 is high the unit 108 applies a data bit to line 112 and when line 106 is high a parity bit is applied to line 114. Since there is no outward difference between data and parity bits, segregating unit 108 depends entirely on the condition of divider 102 to properly route the input pulses to the correct output line.

The output line 104 of the divider 102 toggles the segregating unit 108 to separate the data and parity pulses at one-half the clock rate. To ensure that segregating unit 108 is not out of phase with the incoming signals so as to erroneously apply parity pulses to the line 112 and data pulse to the line 114, the sync signal which is derived from the fifth input level in the analog-to-digital converter 48 is applied to a pulsed shaper 116 which is connected to the "clear" input of the divider 102 to make sure that divider is in the proper condition and phase relationship relative to the input signal values which determine the rate of clock 100. As previously described, the sync signal from generator 116 occurs at the beginning of a baud cycle and, therefore, at the beginning of a two bit combination. Accordingly, the sync signal always places the divider 102 in the "parity" condition, i.e., line 106 is high, such that the segregating unit 108 switches the outgoing bit to the line 114. At the occurrence of the next signal from the clock 100, the divider 102 toggles and operates input line 104 which switches the segregating unit 108 to the "data" condition wherein the outgoing bit is effectively applied to line 112.

Considering the decoder in greater detail, it can be seen that the data bits on line 112 are applied to a data register 118 comprising the serial combination of a 16-bit register 120 and 32-bit registers 122, 124, 126, 128 and 130. The outputs of registers 120, 122, 126 and 130 are connected to the inputs of a modulo two adder 132 which regenerates parity bits from the received data bits according to the same coding pattern established in the register group 66 of the encoder. Since the construction and arrangement of the decoder register group 118 and regenerator adder 32 is identical to that of encoder register group 96 and generator 86, the output of the regenerator adder 132 corresponds identically to the signal stream on output line 114 if no errors occur in the transmission throughout the system of FIG. 1. If any data or parity errors do occur, the parity bits received will differ from those regenerated in the decoder in accordance with a pattern determined by the error and the original code pattern.

To determine whether any such errors have occurred, the parity bits which are regenerated by modulo two adder 132 are applied to a second modulo two adder 134 along with the received parity bits which are directed to line 114. Modulo two adder 134 produces an output bit pattern herein identified as a "syndrome" representing the error pattern in the received signal stream. If no errors are received and detected, the output of adder 134 is simply a stream of ZEROS. However, for any error pattern properly recognized by the decoder of FIG.

3, the output of 134 is some non-ZERO pattern consisting of a series of ZEROS and ONES in accordance with the particular error detected.

The output of adder 134 is connected to the serial combination of a modulo two adder 136, a shift register 138, a second register 140, an adder 142, registers 144 and 146, adder 148 and a register 150. The registers 138, 140, 144, 146 and 150 correspond in capacity and position to the registers 122, 124, 126, 128 and 130 of the register 118. Accordingly, at any time a number of syndrome bits appears at the outputs of the five registers 138, 140, 144, 146 and 150 as an indication of the correctness of the bit about to emerge from register 130 and possibly one other bit in the register group 118.

To determine whether the bit about to emerge from register 130 is correct or has been altered in transit and to correct the bit if necessary, the syndrome bits appearing at the outputs of registers 138, 140, 142, 146 and 150 along with the syndrome bit emerging from adder 134 are applied in parallel to a syndrome scanner 152 which compares the received syndrome bit pattern to a plurality of syndrome codes each of which represents a distinct error pattern involving the data bit at the pre-emergent position in register 130. If the syndrome scanner 152 produces an output signal indicating that the pre-emergent bit is erroneous, a ONE signal is delivered to the input of the modulo two adder 154 which is connected to receive the bits of data as they emerge from register 130. Adder 154 operates to complement the emerging data bit regardless of value if a signal is applied thereto from the syndrome scanner 152. The corrected data bits are applied to a flip-flop 156 which toggles the corrected data bits onto the output terminal 60 shown in FIG. 1.

For a more detailed description of the operation of the encoder circuit of FIG. 2 and the decoder circuit of FIG. 3, reference should be taken to the copending application Ser. No. 885,024 filed in the United States Patent Office on Dec. 15, 1969, and entitled "Distributed Convolutional Error Control System" assigned to the assignee of this application.

OPERATION

The operation of the illustrative embodiment will be described with reference to the simplified timing and waveform diagram of FIG. 4.

Figure 4:
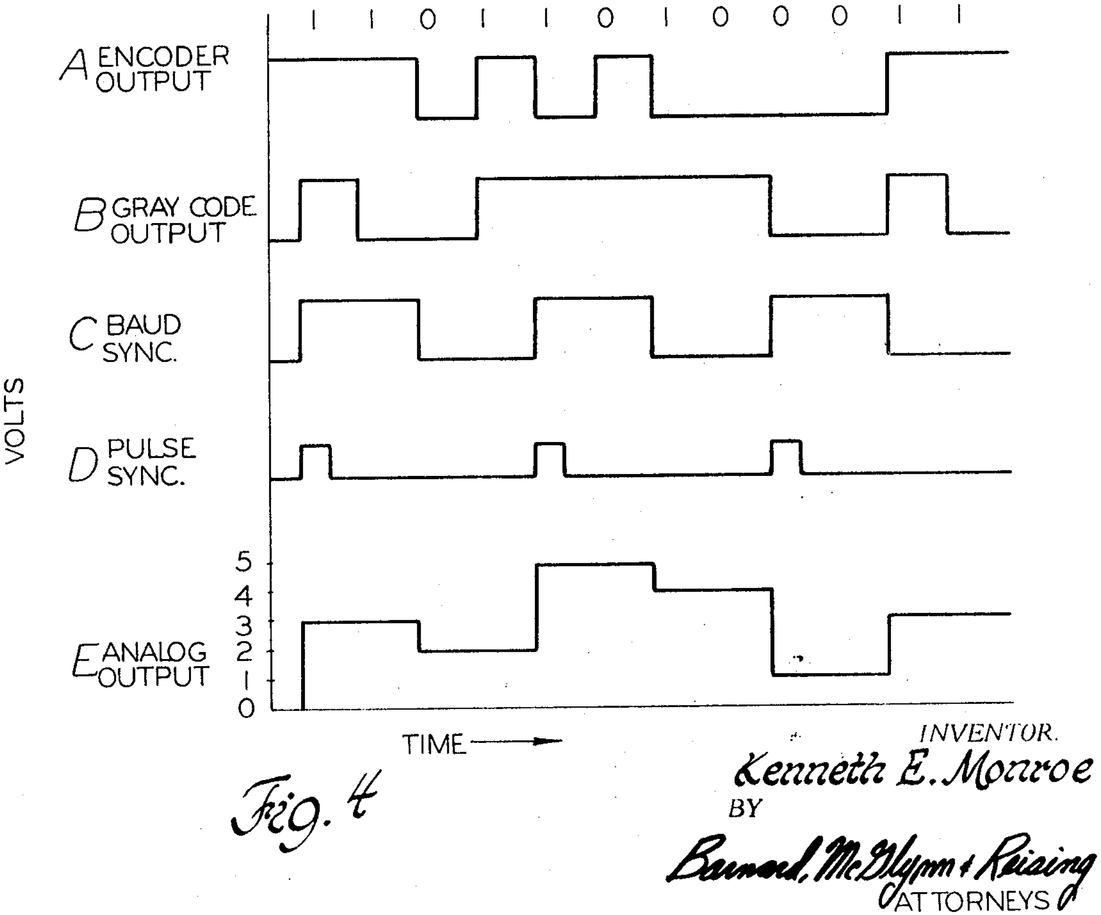
FIG. 4 is a timing diagram useful in describing the operation of the circuit of FIG. 1.

With data source 16 and the clock unit 20 running, the encoder 18 receives digital data signals and produces a stream of parity and data bits at the output thereof as indicated on line B of FIG. 4. The bits are either of positive polarity to represent a binary ONE, or of negative polarity to represent a binary ZERO. Assuming the data from source 16 is random in content, the arrangement of ONES and ZEROS is the encoded stream is also essentially random in nature.

The baud clock 64 of clock unit 20 produces a relatively low frequency square wave signal at essentially one-fourth the encoder output signal rate as shown on line C of FIG. 4. This baud clock signal is of positive polarity during two bits and negative during the next two bits. The one shot generator 92 of FIG. 2 responds to the rise of the baud clock signal to produce a short sync pulse as shown on line D of FIG. 4. This sync pulse is applied to the encoder divider 80 to ensure that the multiplexer 88 is passing a parity bit when the sync signal occurs and to the AND gate 36 to set the converter 34 to the fifth level output condition if the digital signal 11 appears on lines 30 and 32 when the sync signal occurs. The converters 22 and 28 assemble the bits of line B into a two-bit parallel form, each bit group so assembled including first a parity bit and second the data bit which next followed the parity bit in the stream. Assuming the first such bit group included a ONE parity bit and a ZERO data bit as represented by the first two bits on line B of FIG. 4, the converter 34 responds by producing an output of three volts as shown on line E of FIG. 4. This is the preestablished output from converter 34 for a 10 input. Since the signals on lines 30 and 32 are not both ONES, the inputs to AND gate 36 are not all ONES and no output results.

During the next two-bit interval, the parity and data bits are ZERO and ONE respectively. Converter 34 responds to this 01 input to produce an output of 2 volts. No baud sync signal occurs during this interval and again gate 36 produces no output.

During the next two-bit interval both parity and data bits are ONES, as shown on line B of FIG. 4. Moreover, such ONE signals occur simultaneously with a baud sync pulse and, accordingly, all inputs to gate 36 are ONES. Under this condition, gate 36 produces an output which is applied to converter 34 along with the converter 34 to produce an output of 5 volts as shown on line E. This 5 volt signal carries not only information to the effect that the parity and data bits represented by it are ONES, but also carries timing information which will be employed by the decoder-receiver 12 to ensure that it is operating properly. The 5 volt signal is interpreted by analog-to-digital converter 48 as the combined information and timing signal and triggers an output consisting of ONES on lines 50 and 52 as well as line 55. At th decoder 58, the sync line ONE is sharpened by generator 116 and applied to divider 102 to ensure that it is in the parity state, i.e., the line 106 is high. The bit emerging from unit 108 is, thus, directed to line 114 rather than line 112.

The distinction between a parity-data combination 11 which occurs with a baud sync signal and one which occurs without a baud sync signal is shown in the next signal interval of FIG. 4. At this time, both parity and data bits are ONES. However, no baud sync signal occurs. Accordingly, converter 34 receives ONES on lines 30 and 32, but nothing from gate 36. Accordingly, a 4 volt signal is produced as shown on line E. In the receiver-decoder, the 4 volt signal is reconverted to a pair of ONES on line 50 and 52 but no signal results on line 55 and no timing check or correction is made.

The last possible signal combination if 00 which occurs during the next baud interval of FIG. 4. Converter responds to this input to produce a 1 volt output to modulator 40.

The combined information and timing signal will thus occur whenever the bit group converted to analog form is 11 and a baud sync signal occurs simultaneously. Accordingly, no special channel is necessary for the sync signal. The bit combination 11 is chosen for convenience and because it is expected to occur in the Gray code version of the bit stream often enough to accomplish the desired timing correction. It may just as well be any of the other bit combinations, such change being made simply by selecting the proper inputs for gate 36 as will be apparent to those skilled in the art.

It is to be understood that the embodiment described herein is illustrative only and is not intended as limiting the invention to the construction and arrangement of parts described as it is well understood that the invention may be applied to data communication systems differing variously from the illustrated embodiment.

The embodiments of the invention in which an exclusive property or privilege is claimed are defined as follows:

1. In a communication system for transmitting information quantities representing coded data: means for producing first and second signal quantities representing first and second distinct information quantities, respectively, means for producing a control signal having a rate of occurrence related to the rate of occurrence of the information quantities, means connected to receive the information quantities and the control signal and responsive to the substantially simultaneous occurrence of the second information quantity and a control signal to produce a third signal quantity, and means for transmitting the signal quantitites, the combination further comprising means for generating the information quantities and including a source of data and parity bits, and means for segregating the bits into bit groups containing predetermined numbers of data and parity bits, and means responsive to the bit groups to produce information quantities in accordance with the values of the bits in each group.

2. Apparatus as defined in claim 1 wherein the source comprises a data source for producing data bits, and an encoder connected to receive the data bits and to produce parity bits serially and uniformly intermingled with the data bits in continuous fashion.

3. Apparatus as defined in claim 2 wherein each of the bit groups begins with a parity bit.

4. Apparatus as defined in claim 3 including receiver apparatus for receiving the signal values, the receiver apparatus comprising means for receiving the signal values and for reproducing respective information quantities therefrom, means for reproducing the control signal on occurrence of the third signal value, means for reproducing the bit groups representing the information quantities, and decoder means for segregating data bits from parity bits in the bit groups, the decoder means being connected to receive the reproduced control signal to distinguish between the bit types.

5. Apparatus as defined in claim 4 wherein the decoder means has at least two states, each state being characterized by receptivity to a predetermined bit type, the control signal being operative to place the decoder means in the state to receive only a bit of the preselected type.

6. Apparatus as defined in claim 5 wherein the preselected bit type is a parity bit.

7. Apparatus as defined in claim 1 wherein the signal values are voltages of distinct amplitudes.

8. Apparatus as defined in claim 1 wherein the means for producing the bit groups comprises a serial-to-parallel converter.

* * * * *